(12) United States Patent
Rabson et al.

(10) Patent No.: US 7,624,032 B2
(45) Date of Patent: Nov. 24, 2009

(54) METHOD OF MANAGING THE BUSINESS OF A MEDICAL SCHEME

(75) Inventors: Kenneth Steven Rabson, Gauteng (ZA); Adrian Gore, Gauteng (ZA); Herschel Phillip Mayers, Gauteng (ZA)

(73) Assignee: Discovery Life Limited, Sandton, Gauteng (ZA)

( * ) Notice: Subject to any disclaimer, the term of this patent is extended or adjusted under 35 U.S.C. 154(b) by 1343 days.

(21) Appl. No.: 10/818,574

(22) Filed: Apr. 6, 2004

(65) Prior Publication Data

US 2005/0222877 A1 Oct. 6, 2005

(51) Int. Cl.
*G06Q 40/00* (2006.01)
(52) U.S. Cl. .................... 705/4; 705/3; 705/2
(58) Field of Classification Search ........... 705/2–4, 705/21, 40, 36, 30, 35
See application file for complete search history.

(56) References Cited

U.S. PATENT DOCUMENTS

| | | | |
|---|---|---|---|
| 2001/0037214 A1* | 11/2001 | Raskin et al. | 705/2 |
| 2001/0037275 A1* | 11/2001 | Johnson et al. | 705/36 |
| 2002/0002495 A1* | 1/2002 | Ullman | 705/21 |
| 2002/0111827 A1* | 8/2002 | Levin et al. | 705/2 |
| 2002/0138309 A1* | 9/2002 | Thomas, Jr. | 705/4 |
| 2002/0152097 A1* | 10/2002 | Javors | 705/2 |
| 2003/0009355 A1* | 1/2003 | Gupta | 705/2 |
| 2003/0028483 A1* | 2/2003 | Sanders et al. | 705/40 |

* cited by examiner

*Primary Examiner*—Gerald J. O'Connor
*Assistant Examiner*—Natalie A Pass
(74) *Attorney, Agent, or Firm*—Fleit Gibbons Gutman Bongini & Bianco; Paul D. Bianco; Martin Fleit

(57) ABSTRACT

The present invention relates to a method of managing the business of a medical scheme wherein the provider of such medical scheme undertakes liability in return for a premium or contribution, and provides to members who pay such premiums or make such contributions, relevant health services, and/or assistance in defraying expenses incurred in connection with rendering such relevant health services. The improvement comprises in calculating a difference amount which is the amount of the premiums or contributions paid by a member to the medical scheme less the costs incurred on the member's behalf by the medical scheme. This difference amount is then accumulated in a health fund. At a predetermined point in time, if the balance in the health fund is positive, the member is paid out at least a portion of the balance in the health fund.

6 Claims, No Drawings

METHOD OF MANAGING THE BUSINESS OF A MEDICAL SCHEME

BACKGROUND OF THE INVENTION

The present invention relates to a method of managing the business of a medical scheme.

A traditional medical scheme operates with the provider of the medical scheme undertakes liability in return for a premium or contribution and provides to members who pay such premiums or make such contributions, relevant health services and or assistance in defraying expenses incurred in connection with rendering such relevant health services.

The aim of these type of medical schemes is to afford members access to the best health services which they may otherwise not be able to afford.

It benefits the medical scheme when member's claims are lower than their premiums or contributions as the medical scheme is cheaper to operate. This in turn leads to a benefit to members as the amount of their premiums or contributions can be at a lower level.

The present invention seeks to address this.

SUMMARY OF THE INVENTION

According to the present invention there is provided, in a method of managing the business of a medical scheme, wherein the provider of such medical scheme undertakes liability in return for a premium or contribution, and provides to members who pay such premiums or make such contributions, relevant health services, and/or assistance in defraying expenses incurred in connection with rendering such relevant health services, the improvement comprising:

calculating a difference amount which is the amount of the premiums or contributions paid by a member to the medical scheme less the costs incurred on the member's behalf by the medical scheme;

adding the difference amount to a health fund; and at a predetermined point in time, if the balance in the health fund is positive, paying out to the member at least a portion of the balance in the health fund.

The predetermined point in time is preferably at least one of the group consisting of: after a predetermined amount of time has lapsed; when the member reaches a predetermined age; when the member suffers a severe illness or disability.

If the predetermined point in time is after a fixed interval, a plurality of payments may be made out to the member each time the fixed interval passes.

In addition, the balance in the health fund may be paid out to the member when the member reaches a predetermined age.

Preferably, an interest amount is calculated and added to the balance in the health fund. This interest amount is calculated using a number of points earned by the member in an incentive programme operated by the medical scheme.

DESCRIPTION OF PREFERRED EMBODIMENTS

The present invention finds application in the field of managing the business of a medical scheme. Typically, the provider of such medical schemes undertakes liability in return for a premium or contribution, and provides to members who pay such premiums or make such contributions, relative health services and or assistance in defraying expenses incurred in connection with rendering such health services.

In accordance with the present invention, a difference amount is calculated which is the amount of the premiums or contributions paid by a member to the medical scheme less the costs incurred on the member's behalf by the medical scheme. The difference amount is then added to a health fund.

It will be appreciated that if the amount of the premiums or contributions paid by a member to the medical scheme is greater than the costs incurred on the member's behalf by the medical scheme, the difference amount will increase the balance in the health fund. On the other hand, if the costs incurred on the member's behalf by the medical scheme are greater than the amount of the premiums or contributions paid by the member to the medical scheme, the difference amount will decrease the balance in the health fund.

At a predetermined point in time, if the balance in the health fund is positive, the member is paid at least a portion of the balance in the health fund.

The predetermined point in time is at least one of the group consisting of: after a predetermined amount of time has lapsed; when the member reaches a predetermined age; when the member suffers a severe illness or disability.

In any of the above-mentioned cases, the predetermined point in time will typically be decided at the time that the member joins the medical scheme, for example.

The predetermined amount of time may be a period of year whilst the predetermined age may be an age when the member would typically retire, such as age 65, for example.

Alternatively or in addition, the member is paid out at least a portion of the balance in the health fund if the member suffers severe illness or disability.

Depending on the circumstances, a specific portion of the balance in the health fund is paid out to the member whereas in other circumstances the total balance in the health fund is paid out to the member.

In one exemplary embodiment, at the end of each five-year cycle, a portion of the balance in the health fund is paid out to the member. The portion to be paid out is calculated by determining the difference amount for the previous five years. This difference amount is the difference between the amount of the premiums or contributions paid by the member to the medical scheme and the costs incurred on the members behalf by the medical scheme during the same five-year period. If the difference amount is positive, a percentage of this difference amount for the five-year period is paid to the member.

The percentage of the difference amount paid out can vary depending on the number of products purchased by the member from the medical scheme's suite of products and depending on the status of the member within an incentive programme operated by the medical scheme.

An example of such an incentive programme is presently managed by the applicant which manages a traditional indemnity health insurance plan together with their so-called Vitality™ programme disclosed in the applicant's co-pending U.S. patent publication Ser. No. 09/982,274, the contents of which are incorporated herein by reference.

The Vitality programme rewards members for utilising approved health related facilities and/or services. For example, members are rewarded for utilising gymnasiums, Smoke Enders™ and Weighless™.

Members are rewarded by a points allocation system and depending on the total number of points allocated to a member, they fall within one of four categories. In the implementation of the Vitality programme, these categories have been named blue, bronze, silver and gold. All members are placed initially in the blue category and only once a member has accumulated a number of points is their Vitality status upgraded of the next appropriate class.

With the above in mind, the following is an example of a table used to calculate the percentage. The "Credit card", "Vestable life", "Life plan" and "Health Plan Protector" are all products which the member is able to purchase from the medical scheme.

| | Benefits included in Policy | | | |
|---|---|---|---|---|
| Vitality Statuses | Discovery Credit Card Vestable Life Life Plan Health Plan Protector | Vestable Life Life Plan Health Plan Protector | Life Plan Health Plan Protector | Health Plan Protector |
| Blue | 20% | 15% | 10% | 5% |
| Bronze | 40% | 30% | 15% | 10% |
| Silver | 80% | 60% | 35% | 15% |
| Gold | 100% | 75% | 50% | 20% |

In addition, an interest amount can be added to the balance in the health fund with the interest amount typically being calculated by using an interest-rate defined by the medical scheme which is multiplied by the balance in the health fund to calculate the interest amount.

The interest rate defined by the medical scheme can also link into the Vitality product whereby the interest rate is higher or lower depending on the member's Vitality status. For example:

Blue—basic interest rate.
Bronze—basic interest rate plus 0.5%.
Silver—basic interest rate plus 2%.
Gold—basic interest rate plus 4%.

Using all of the above in an example leads to the following where "p-c" denotes the difference amount.

| Example: Assume Interest rate as defined by Discovery Life equal to: 2% Health Plan Protector Policyholder: | | | |
|---|---|---|---|
| | P-C | Vitality Status | % Paid Out |
| Year 1: | 100 | Blue | 5% |
| Year 2: | 150 | Bronze | 10% |
| Year 3: | 200 | Gold | 20% |
| Year 4: | 350 | Silver | 15% |
| Year 5: | 400 | Gold | 20% |

Amount Paid out after 5 years is equal to: [5% * R100 + 10% * R150 + 20% * R200 + 15% * R350 + 20% * R400] = R192.50
Health Fund Balance at:

| End Year 1: | 100.00 |
|---|---|
| End Year 2: | 100.00 * (1 + 2.5%) + 150 = 252.50 |
| End Year 3: | 252.50 * (1 + 6%) + 200 = 467.65 |
| End Year 4: | 467.65 * (1 + 4%) + 350 = 836.36 |
| End Year 5: | 836.36 * (1 + 6%) + 400 − 193 = 1094.04 |

In another exemplary embodiment, at least a portion of the balance in the health fund is paid to the member if the member suffers a severe illness or disability. In addition, if the member dies, at least a portion of the balance in the health fund is paid to the member's nominated beneficiary or beneficiaries.

In this regard, a plurality of severe illnesses and disabilities are categorised into a severity A level or a severity B level. If the member suffers a severity A level severe illness or disability they will be paid out the total balance in the health fund. If the member suffers a severity B level severe illness or disability they will be paid out a portion of the total balance in the health fund.

If the member suffers a plurality of severity B level severe illnesses or disabilities, they will be paid out a portion of the total balance in the health fund for each occurrence of the severity B level severe illness or disability, provided that the total does not add up to more than the total balance of the health fund.

It will be appreciated that by offering members the facility of the health fund which is paid back to them at a point in time, the medical scheme encourages its members to look after their health and to minimize the amount of claims made to the medical scheme. This in turn allows the medical scheme to keep the quantum of the members premiums or contributions to a lower level, thus benefiting all members.

We claim:

1. A method of managing the use of a medical insurance plan comprising:
   loading member application forms for one of a plurality of member selected medical insurance plans in a computer system managed by an insurance provider, wherein members receive allocated points for using plan approved health related facilities and services;
   loading into the computer system managed by the insurance provider plan approved health related facilities and services;
   receiving by the computer system managed by the insurance provider, premium payments and contributions from members of selected medical insurance plans wherein the insurance provider undertakes liability in the selected medical insurance plans;
   creating by the computer system managed by the insurance provider a health fund for each member into which the payments and contributions are received;
   offering by the computer system managed by the insurance provider said plan approved related facilities and services;
   monitoring, by the computer system managed by the insurance provider, usage of plan approved health related facilities and services by each member;
   allocating by the computer system managed by the insurance provider in response to the monitoring of plan approved health related facilities and services points awarded to each member according to their use of plan approved health related facilities and services;
   creating by the computer system managed by the insurance provider a listing of each member and points accumulated;
   calculating via the computer system managed by the insurance provider a difference amount which is the amount of the premiums or contributions paid by a member to a medical insurance plan less the costs incurred on the member's behalf by the medical insurance plan;
   adding by the computer system managed by the insurance provider the calculated difference amount to the member's health fund;
   calculating periodically for each member, by the computer system managed by the insurance provider, an interest amount by an interest rate linked to the selected insurance plan and linked to the member's accumulated points for the period of calculation multiplied by the balance in member's health fund;
   adding the calculated interest amount for each member to member's health fund;
   at a preselected time determined and tracked by the computer system managed by the insurance provider, determining by the computer system managed by the insurance provider if the balance in the health fund is positive; and responsive to a determination by the computer system managed by the insurance provider of a positive balance, determining a payout to the member of at least a portion of the balance in the health fund including the interest amount; and paying out by the computer system managed by the insurance provider the determined payout to the member.

2. The method according to claim 1 wherein the determination by the computer system managed by the insurance provider of the predetermined point in time is based on at least one of the group consisting of: after a predetermined amount of time has lapsed; when the member reaches a predetermined age; when the member suffers a severe illness or disability.

3. The method according to claim 2 wherein the predetermined point in time is based on a fixed interval and wherein a plurality of payments are made out to the member, one each time the fixed interval passes.

4. The method according to claim 2 wherein the predetermined point in time is based on when the member reaches a predetermined age whereupon the computer system managed by the insurance provider pays out the balance of the health fund to the member.

5. The method according to claim 1 wherein the of health-related facilities and services includes at least one of membership of health clubs, membership of gymnasiums, membership of fitness programs, a medical advice service, predetermined preventive medical procedures, weight loss programs, programs to quit smoking advance pre-authorization of hospitalization, advance pre-authorization of treatment, registration for electronic funds transfer, and compliance with preferred procedures.

6. The method according to claim 1 including the further step of creating by the computer system managed by the insurance provider a plurality of graduated categories from the lowest to the highest and listing members who accumulate said points initially in the lowest category, and stepping each member upwardly in response to being allocated preselected numbers of points wherein the interest rate is linked to the selected insurance plan and linked to the member's category for the period of calculation.

* * * * *